Oct. 14, 1969     L. J. CONRAD     3,472,300
METHOD AND APPARATUS FOR DISCONNECTING THE COMPONENTS
OF COMPOSITE FOOD PIECES
Filed Dec. 21, 1966     2 Sheets-Sheet 2

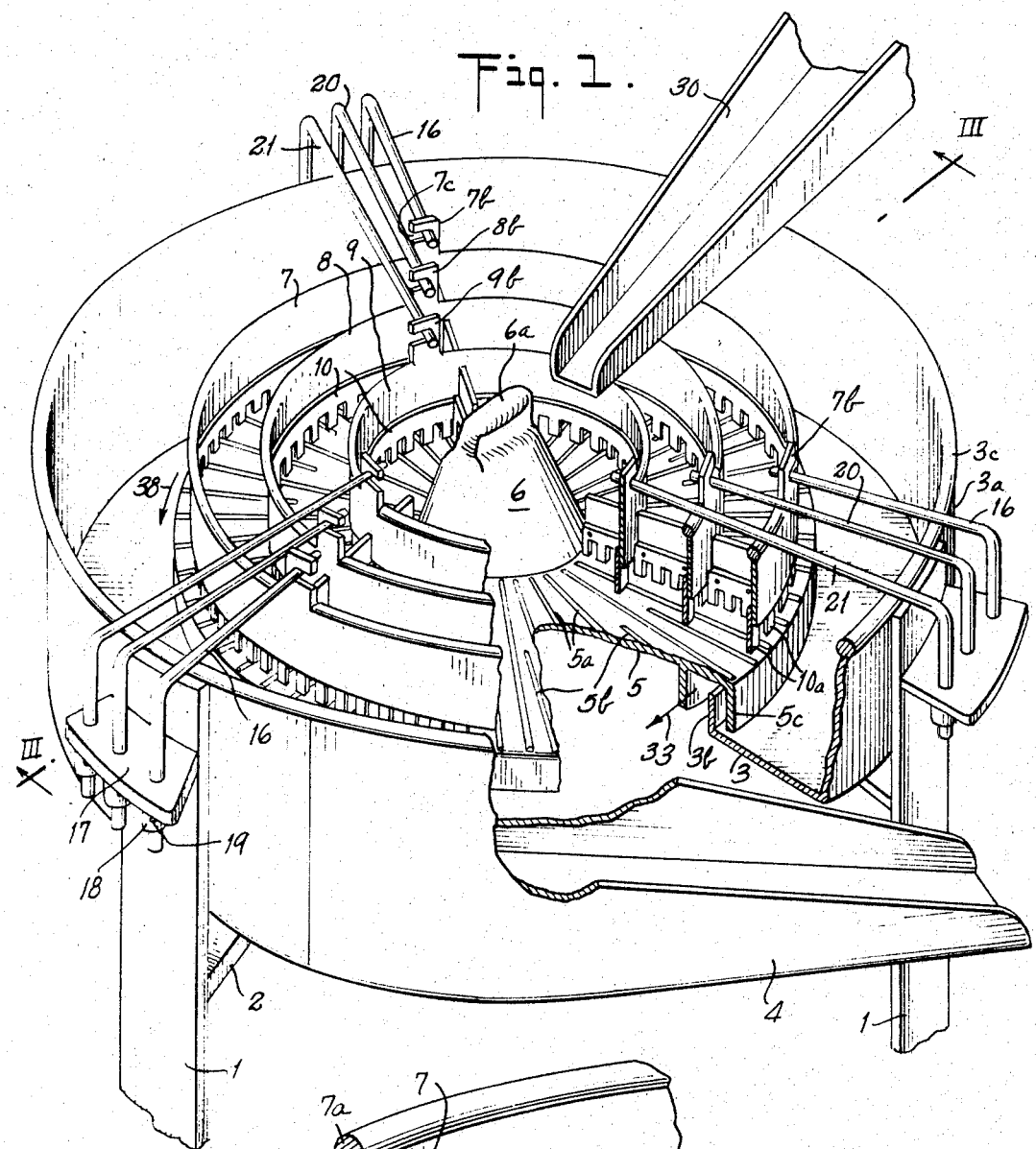

INVENTOR.
LUCAS J. CONRAD
BY Lester N. Clark
ATTORNEY

United States Patent Office 3,472,300
Patented Oct. 14, 1969

3,472,300
**METHOD AND APPARATUS FOR DISCONNECT-
ING THE COMPONENTS OF COMPOSITE
FOOD PIECES**
Lucas J. Conrad, Winston-Salem, N.C., assignor to R. J.
Reynolds Tobacco Company, Winston-Salem, N.C., a
corporation of New Jersey
Filed Dec. 21, 1966, Ser. No. 603,484
Int. Cl. B02b 7/04; A01f 31/00
U.S. Cl. 146—225        15 Claims

ABSTRACT OF THE DISCLOSURE

Composite food pieces, e.g., meat clinging to bone, fruit pits clinging to fruit flesh, are fed into the center of a rotating disk, accompanied by fluid under light pressure. The disk is ribbed and a plurality of downwardly depending tines have their tips spaced slightly above the ribs. The pieces are driven centrifugally and by fluid pressure difference outwardly to the periphery of the disk and are there discharged. During their passage between the tines and the ribs of the disk, the composite pieces are pulled apart, so that the material discharged is a mixture of separated fleshy portions and hard portions. Radial tine arrays prevent the pieces from traveling any substantial distance circumferentially of the disk. All parts contacted by food are arranged for easy disassembly and cleaning. Alternative tine arrays and alternatives to the disk are described.

BACKGROUND OF THE INVENTION

In the preparation of food, e.g., for canning, freezing, or other operations, it is in many cases desirable to separate composite food pieces into components of different characteristics. Typically, fleshy, edible parts of the food are separated from relatively hard, inedible parts. However, in mnay cases the separation required is more complex. For example, in preparing chicken for canning, it is desirable to separate the lean meat from the bone, fat, and skin. On the other hand, in preparing cherries for canning, it is necessary only to separate the fleshy part of the fruit from the pit.

In order to accomplish such a separation, it is usual first to treat the composite pieces so as to disconnect the clinging components of different characteristics, thereby producing a heterogeneous mixture of parts. This mixture is thereafter classified into groups of homogeneous parts by means which may, for example, depend upon the difference in densities of the parts.

The present invention relates to an improved method and apparatus for accomplishing this initial disconnection. In prior art methods and apparatus for this purpose, it has been common to subject the composite pieces of food to an impact, typically in a hammer mill. In many cases, such an impact has a deleterious effect on the food, since it tends to crush the fleshy parts, making them less palatable, and also tends to shatter the hard parts, with the resulting possibility that some of the shattered fragments may get into the final food products.

SUMMARY OF THE INVENTION

The present invention relates to a method and apparatus for separating composite pieces of food consisting of clinging components of different characteristics and value. The food pieces are placed on a supporting bed having upwardly projecting protuberances and the pieces are moved along the bed between the protuberances and an array of flexible tines spaced slightly above the tips of the protuberances. The protuberances and the tines cooperate to separate the moving pieces into their components by steady, gentle forces rather than by sharp impacts. The forces are distributed through large volumes of the pieces rather than being concentrated. In the disclosed embodiment, the supporting bed is a rotating disk and the protuberances are radial ribs in the upper surface of the disk. The tines are arrayed in a plurality of rings concentric with the axis of the disk, with spaced radial arrays of tines extending between the tine rings. The disk and the tine rings and all parts of the apparatus which must touch the food pieces are constructed for ready removal and cleaning.

The movement of the food pieces between the tines and the supporting conveyor may be assisted by an accompanying flow of fluid. In the embodiment illustrated, the fluid is a liquid, such as water, which is introduced at the center of the rotating disk, and flows outwardly and is discharged at the periphery.

BRIEF DESCRIPTION OF THE DRAWINGS

FIG. 1 is a perspective view, partly broken away and shown in section, illustrating a food separating apparatus embodying the invention;

FIG. 2 is an enlarged fragmentary view of a portion of the apparatus in FIG. 1, showing the manner of assembling the tine strips to the tine supports;

DESCRIPTION OF THE PREFERRED EMBODIMENTS

Figure 3:
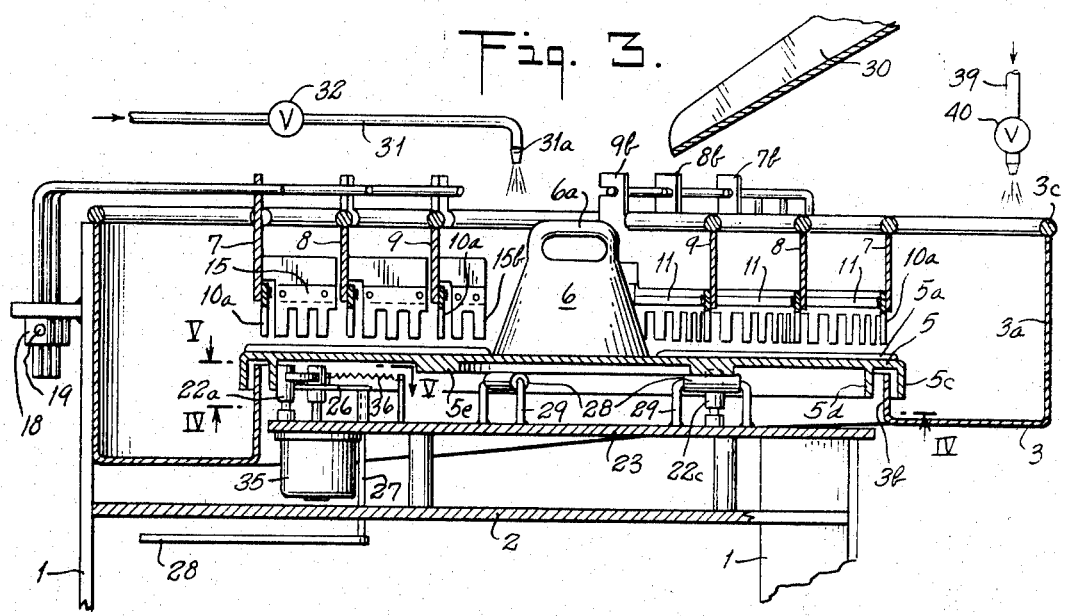
FIG. 3 is a section taken on the line III—III of FIG. 1, looking in the direction of the arrows.

The apparatus illustrated in FIG. 1 is generally cylindrical, and is supported on three peripherally spaced legs 1 connected by one or more transverse frame members 2. On the top of the legs 1, there is supported a helical discharge channel 3 having an outer flange 3a, an inner flange 3b, and a ring 3c formed at the upper edge of its outer flange and adapted to rest on the tops of the legs 1. The inner flange 3b is considerably shorter than the outer flange 3a of the channel member 3. The web of the channel forms a single turn helix about the axis of the apparatus and communicates at its lower end with a discharge chute 4. Rotatably supported above the inside flange 3b of the channel 3 is a disk 5 having formed in its upper surface two arrays 5a and 5b of radially extending ribs. The arrays 5a extend from a point near the center of the disk 5 to its periphery. The ribs 5b are considerably shorter and extend from a point approximately opposite the middle of the ribs 5a to the periphery of the disk. The center of the disk is attached as by welding to an upwardly projecting streamlined cone 6 having a handle 6a formed on its top. Although radial ribs are shown, and are presently preferred, the ribs may be skewed slightly from the radial direction, or they may be curved, for example, in a spiral form.

While it is preferred to have the disk 5 flat, as shown, it may be made with its upper surface slightly convex, or conceivably slightly concave if that is more suitable to the particular food products being treated.

Supported above the disk 5 by means to be described in detail below, are three tine mount rings 7, 8 and 9. A fragment of the tine mount ring 7 is shown in greater detail in FIG. 2. The ring 7 comprises a cylindrical hoop having a stiffening ring 7a of circular cross-section welded along its upper edge. Attached to the inside of the lower edge of the ring 7 is a tine strip 10, which is of flexible material, such as a fabric reinforced rubber or plastic material of the type commonly used in belting or the like. The lower edge of the strip 10 is cut away at spaced intervals to provide downwardly depending tines 10a which extend completely around the bottom of the tine supporting ring 7. For use with chicken wings, it has been found suitable to use tines ¾" long, ¼" wide, and spaced ¼" apart, and cut square at their ends, as shown. Other foods may be better handled by tines of other shapes and dimensions.

The tine strip 10 is held in place by an expansion ring clamp 11 having lugs 11a formed at its ends to receive between them a coil spring 12 which holds the ring 11 expanded and thus compresses the upper edge of the tine strip tightly against the tine amount ring 7.

The tine mount rings 8 and 9 are provided with similar tine strips 10 supported in a similar fashion.

Each of the tine mount rings 7, 8 and 9 is provided with a plurality of radially inwardly directed plates 13 extending vertically and having near their bottom edges a plurality of projecting studs 14. A corresponding plurality of radial tine strips 15 is provided, each having keyhole slots 15a by which it may be mounted on the studs 14, and cut away along its bottom edge to provide downwardly depending tines 15b. Similar arrays of radially extending tines are provided on the radial plates 13 of each of the tine mount rings 7, 8 and 9.

The supporting mechanism for one of the tine mount rings, specifically, the outermost ring 7, comprises a plurality of upwardly projecting lugs 7b attached to the ring 7a at three equally spaced points around the periphery of the ring. Each of the lugs 7b has a laterally open slot 7c formed in one side thereof and adapted to receive the radially inner end of an arm 16 whose outer end is bent downwardly and rotatably supported in a plate 17 attached to one of the legs 1. Suitable means, shown as a collar 18 and a set screw 19 are provided for adjusting the vertical position of the arms 16 and hence of the tine mount ring 7.

A similar array of supporting arms 20 is provided for the ring 8 and another array of arms 21 for the ring 9. In any machine intended for use with all the tines at the same level, a single set of arms 21 may be used to support all three rings.

Figure 4:
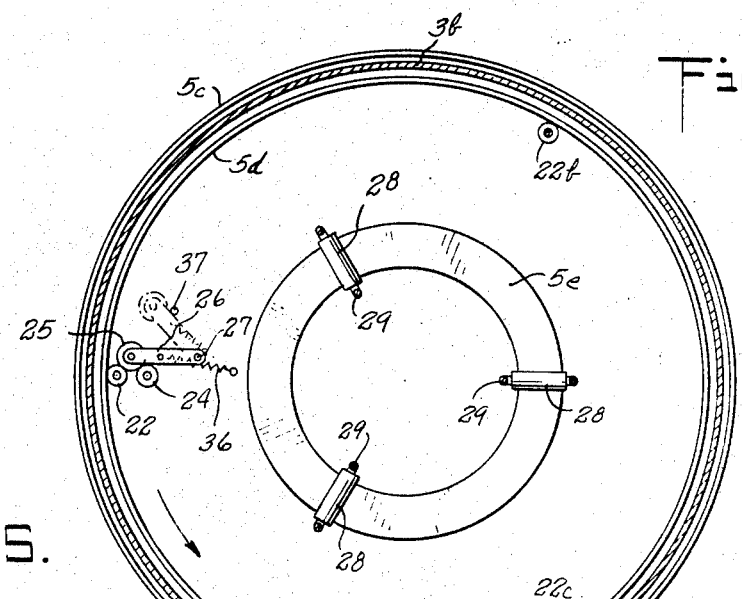
FIG. 4 is a bottom plan view of the central rotating disk, illustrating the driving and supporting mechanism.
Figure 5:
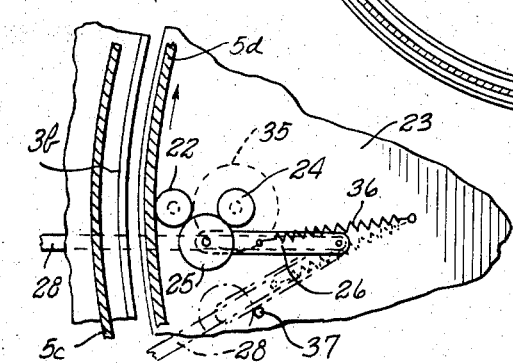
FIG. 5 is a fragmentary view taken on the line V—V of FIG. 3, further illustrating the driving mechanism for the rotating disk.

The disk 5 is provided at its periphery with a downwardly depending flange 5c which overlaps the upwardly extending inner flange 3b of the channel 3. Spaced inwardly from the flange 5c by a distance sufficient to clear the flange 3b, is a driving flange 5d concentric with the flange 5c. The driving flange 5d is engaged at three localities spaced 120° apart by three rollers 22a, 22b, 22c (see FIGS. 3–5), journaled on a supporting plate 23, suitably mounted on the frame member 2. Another roller 24 is journaled in the plate 23 at a point spaced a short distance from one of the rollers 22. The roller 24 is rotated by a motor 35, which may be supported on the under side of the plate 23.

Rotary motion may be transmitted from the roller 24 to the adjacent roller 22 by the action of a clutch roller 25 pivoted on the end of a toggle arm 26, which is attached to a shaft 27 journaled in the plate 23 and rotatable by means of a crank arm 28. The toggle arm is biased by a spring 36 to the full line position of FIG. 4, wherein motion is transmitted from roller 24 through roller 25 to roller 22, thereby driving the flange 5d and rotating the disk 5. If it is desired to stop rotation of the disk, the crank arm 28 may be actuated to swing the toggle arm 26 and move the spring 36 over center so that it then biases the arm against a stop 37, and the driving train is interrupted at roller 25.

The weight of disk 5 and any food pieces supported thereon is carried by a downwardly projecting annular track 5e formed in its lower surface. The track 5e is supported at three points spaced 120° apart by rollers 28 journaled on yokes 29 which are in turn supported on the plate 23.

OPERATION

The food pieces to be separated, which may, for example, be cooked chicken wings, are supplied to the upper center of the disk 5 by means of a chute 30, or by any other suitable delivery mechanism. At the same time a suitable fluid, in this case a liquid, such as water or brine, is supplied through a pipe 31 controlled by a valve 32 and terminating at a nozzle 31a directed downwardly toward the central part of the disk 5.

The spacing between the tips of the tines 10a and the ribs 5a and 5b may be adjusted by means of the set screws 18. The heights of the several rings, and hence the tine-rib spacing, may be adjusted to the same level, or to different levels. For example, the outermost ring may be set for the closest spacing, with the two inner rings being set for a somewhat higher spacing. The radial rows of tines may be set for the same or different spacing by the selective use of tine strips 15 having keyhole slots 15a at different distances from the tips of tines 15b. For chicken wings, this spacing should be adjusted so that the clearance is less than the smallest dimension of the food parts being processed. For other food products, it may be desirable to reduce the clearance, possibly even to zero.

The motor 35 is started and the clutch 25 is engaged so that the disk 5 turns in the clockwise direction as shown by the arrow 33 in FIG. 1. As the disk turns, centrifugal forces tend to move the pieces outwardly of the disk under the tines 10a. As the pieces pass the tines 10a, the fleshy parts of the food pieces are engaged by the tines and are stripped from the bones. The ribs 5a and 5b define outwardly expanding channels through which the separated food parts may pass, so that once a piece of food starts moving outwardly through such a channel, the increasing space between the ribs makes it easy for the piece to continue movement in the outward direction. Some pieces are, of course, carried around circumferentially of the disk 5. Such pieces periodically encounter the radial tines 15a, which tend to retard their circumferential movement, thereby increasing the tendency of the pieces to be moved centrifugally, outwardly through the rings of tines 10a. The outward movement of the pieces is assisted by the flow of liquid, which is continuously entering the apparatus at the center of the disk and flowing outwardly to the periphery.

It is not necessary that any fluid be used. If a fluid is used, it may be either gas or liquid, and should be chosen in accordance with the characteristics of the food particles being treated. It is preferable that no substantial fluid pressure be applied, but rather that the velocity head of the fluid be slightly greater than zero. The flowing fluid tends to push the food particles which may be retarded by the tines and assists in the separation of the meat from the bones.

The forces acting outwardly on each food piece are all distributed substantially equally through the piece. Those forces are either centrifugal forces, or pressure forces due to the flowing liquid. On the other hand, the force resisting outward movement acts through the tines on the particular limited area of the surface of the piece which engages the tines. When a chicken wing is properly cooked, the tensile strength of each homogeneous part, i.e., either lean meat, skin, fat, bone, or wing tip, is greater than the tensile strength of the bond connecting that part to the other parts of the wing. Hence, when a localized force is applied in one direction on one such part, and a generalized force is applied in the opposite direction to other parts clinging to the one part but non-homogeneous therewith, the one part tends to become separated from the others.

The product discharged at the periphery of the disk 5 is a mixture of meat, skin, bones and wing tips. The meat strips have been separated from the bones so that there is no clinging of the meat to the bones. The mixture passes down through the helical channel 3, in the direction of arrow 38 in FIG. 1, and out through the chute 4. The flow of mixed parts may be assisted by additional liquid supplied through a pipe 39 and controlled by a valve 40 located near the upper end of the channel 3. While the helical channel 3 provides a convenient and compact arrangement for receiving the product of the machine, other equivalents may be used. It is only necessary that the receiving mechanism encircle the machine, so as to receive the discharge from all parts of the periphery of disk 5.

The mixture delivered from the machine may be segregated into its component parts by techniques well known in the art, such as flotation methods, depending upon the difference in density of the various parts.

CLEANING

When it is desired to clean the machine, the entrance chute 30 is first swung out of the way by any conventional means. The arms 16, 20 and 21 are then pivoted outwardly so that they are approximately tangent to the periphery of the channel 3. The time mount rings 7, 8 and 9 are then free to be lifted bodily out of the machine. The disk 5 may similarly be lifted by means of the handle 6a, after which the helical discharge channel may also be lifted out for cleaning. The tine rings 10 may readily be separated from the tine mount rings 7, 8 and 9, by compressing the spring 12, thereby releasing the spring clamps 11. Compression of springs 12 may require use of a tool similar to an automotive engine valve lifter. The radial tine strips 15 may be removed from the radial tine supports 13 by means of the keyhole slots 15a. Thus it may be seen that the entire assembly may be quickly and readily taken apart so that the separate parts may be thoroughly cleaned and that the only special tool necessary for the separation of the parts is the spring compressor used on the springs 12.

While I have shown an array of tines consisting of three rows concentric about the axis of rotation of the disk, together with radial rows of tines extending between the concentric rows, it should be understood that other arrays of tines may produce equivalent results. For example, the rows of tines might be eccentric. There might be only one row, or any suitable number other than three. The radial rows might be omitted. The tines may be arranged in spirals rather than in circles. Where a spiral array of tines is used, it may be either in one continuous spiral forming the several loops around the axis, or several spirals, each extending only part of the way around the axis.

While the tine array shown is stationary, it may in some cases be desirable to rotate, oscillate, vibrate or otherwise move the tine array as the disk rotates.

While I have shown and described certain preferred embodiments of my invention, other modifications thereof will readily occur to those skilled in the art, and I therefore intend my invention to be limited only by the appended claims.

I claim:
1. Apparatus for disconnecting the components of composite food pieces consisting of clinging component parts of different characteristics, wherein the improvement comprises:
   (a) means defining a path of movement for said pieces, said means including a horizontally extending disk, mounted for rotation about a vertical axis and having an array of upwardly projecting blunt protuberances on its upper surface, which surface defines the bottom of said path from the central portion of the disk to the disk periphery;
   (b) an array of flexible tines extending transversely of said path above said disk between the axis and the disk periphery;
   (c) means supporting said tines with their tips projecting downwardly toward said protuberance so that all pieces moving along said path must move between the array of tines and the protuberances, the cooperation of the tines and blunt protuberances acting to gently disconnect the component parts;
   (d) means for moving said pieces along said path and between said tines and said disk including means for rotating the disk; and
   (e) means for receiving disconnected parts of said food pieces after passing between the tines and the disk.

2. Apparatus as defined in claim 1, in which:
   (a) said moving means includes means for supplying fluid under a positive head to said path at the approach side of said array of tines; and
   (b) said apparatus includes means for receiving fluid passing through the array of tines.

3. Apparatus as defined in claim 1, in which:
   (a) said array of tines encircles said axis;
   (b) said apparatus includes means for supplying said composite food pieces downwardly onto the central portion of said disk; and
   (c) means at the periphery of the disk for receiving all of the disconnected parts of said food pieces which pass between the tines and the disk.

4. Apparatus as defined in claim 1, in which said upwardly projecting protuberances comprise an array of substantially radially extending ribs on the disk.

5. Apparatus as defined in claim 1, in which said tine array comprises a plurality of rows of flexible tines extending transversely of said path of movement.

6. Apparatus as defined in claim 1, in which:
   (a) said apparatus includes a plurality of rows of tines concentrically encircling said axis; and
   (b) radially extending rows of tines between said encircling rows.

7. Apparatus as defined in claim 1, in which said array of upwardly projecting protuberances comprises a first array of radial ribs extending from a locality near the center of said disk, to a locality near the periphery thereof, and a second array of radial ribs extending from a locality radially outward of the inner ends of the first array to a locality near the periphery of the disk, the ribs of the second array being located between the ribs of the first array.

8. Apparatus as defined in claim 1, in which said tine supporting means includes a tine mount ring concentric with the axis of rotation of said disk.

9. Apparatus as defined in claim 8, in which:
   (a) said tines are formed in a strip of flexible material extending around the inside of the lower edge of said ring; and
   (b) said tine supporting means includes a circular spring clamp expandable against the strip of tine material for holding it on the ring.

10. Apparatus as defined in claim 8, including:
   (a) three upwardly extending peripherally spaced projections on the tine mount ring, each projection having a laterally opening slot therein; and
   (b) three radially extending bars above the disk, said bars being pivoted at their outer ends for rotation about axes parallel to the axis of rotation of the disk and having their inner ends movable into said slots to support the ring;
   (c) said bars being rotatable between a radial position wherein they support the ring and a tangential position wherein they are free of the ring and the ring may be removed from the apparatus by lifting.

11. Apparatus as defined in claim 10, including:
   (a) means supporting said disk including a plurality of horizontal axis rollers on which the disk rests;
   (b) said means for rotating the disk comprises a plurality of vertical axis rollers engaging a downwardly depending flange on the disk;
   (c) said disk being disengageable from the supporting means and the driving means by lifting, after the tine mount ring has been removed.

12. Apparatus as defined in claim 10, including:

(a) a supporting frame comprising three peripherally spaced legs;
(b) said means for receiving the disconnected parts comprises a trough extending around the periphery of the disk and having an outer vertical wall with a horizontally extending flange adapted to rest on the tops of said legs; and
(c) brackets on the outer sides of said legs pivotally supporting said outer ends of said bars;
(d) said trough having a vertical inner wall and said disk having a downwardly depending flange outside the inner wall, said trough being removable from the apparatus by lifting after the disk has been removed.

13. The method of disconnecting the components of composite food pieces consisting of clinging component parts of different characteristics wherein the improvement comprises the steps of:
(a) delivering pieces to be disconnected onto a substantially horizontal bed having upwardly extending blunt protuberances on its surface;
(b) rotating the bed about a vertical axis to accelerate the pieces centrifugally toward its periphery;
(c) intercepting the accelerated pieces with an array of downwardly depending flexible tines causing the pieces to be forced between the tines and the blunt protuberances which cooperate to gently disconnect the component parts; and
(d) collecting the disconnected parts as they pass the periphery of the bed.

14. The method as defined in claim 13, including the further step of assisting the motion of the pieces by supplying fluid at the approach side of the tines and removing said fluid from the opposite side of the tines.

15. The method of claim 13, including the further step of retarding the circumferential motion of the pieces on the rotating bed.

References Cited
UNITED STATES PATENTS

| | | | |
|---|---|---|---|
| 2,318,805 | 5/1943 | Silva | 146—55 |
| 2,906,308 | 9/1959 | Genetti | 146—76 X |
| 3,142,860 | 8/1964 | Churchill | 17—1 |
| 3,192,974 | 7/1965 | Hickey et al. | 146—50 |
| 3,256,555 | 6/1966 | Paoli | 17—1 |

W. GRAYDON ABERCROMBIE, Primary Examiner

U.S. Cl. X.R.

17—1; 146—76, 226, 237